(12) United States Patent
Strelow

(10) Patent No.: US 6,298,869 B1
(45) Date of Patent: Oct. 9, 2001

(54) REVERSE BUCKLING, THERMOFORMED, POLYMER RUPTURE DISK

(75) Inventor: John L. Strelow, Broken Arrow, OK (US)

(73) Assignee: Oklahoma Safety Equipment Co., Broken Arrow, OK (US)

( * ) Notice: Subject to any disclaimer, the term of this patent is extended or adjusted under 35 U.S.C. 154(b) by 0 days.

(21) Appl. No.: 09/512,488

(22) Filed: Feb. 24, 2000

(51) Int. Cl.[7] .................................................. F16K 17/40
(52) U.S. Cl. ...................... 137/68.26; 137/27; 137/910; 220/89.2
(58) Field of Search ............................... 137/68.19, 68.26, 137/68.25, 68.27, 910; 220/89.2

(56) References Cited

U.S. PATENT DOCUMENTS

| | | | |
|---|---|---|---|
| 4,416,388 | * | 11/1983 | Mulawski .............................. 137/910 |
| 4,669,626 | * | 6/1987 | Mozley ............................... 137/68.27 |
| 4,905,722 | * | 3/1990 | Rooker et al. ..................... 137/68.27 |
| 5,002,085 | * | 3/1991 | FitzGerald ........................ 137/68.27 |
| 5,050,630 | * | 9/1991 | Farwell et al. .................... 137/68.25 |
| 5,411,158 | * | 5/1995 | Kays et al. ........................ 137/68.27 |
| 5,934,308 | * | 8/1999 | Farwell ............................. 137/68.27 |

FOREIGN PATENT DOCUMENTS

2016072 * 11/1990 (CA) .

* cited by examiner

Primary Examiner—Michael Powell Buiz
Assistant Examiner—Ramesh Krishnamurthy
(74) Attorney, Agent, or Firm—Jones, Day, Reavis & Pogue

(57) ABSTRACT

A thermoformed reverse buckling polymer rupture disk having an unsupported raised center portion including score lines cut in the polymer disk that creates a line of weakness to control the buckling pressure of the disk and forms a predetermined burst pattern.

13 Claims, 2 Drawing Sheets

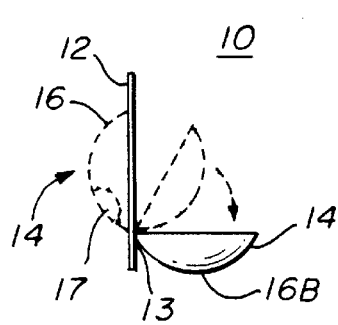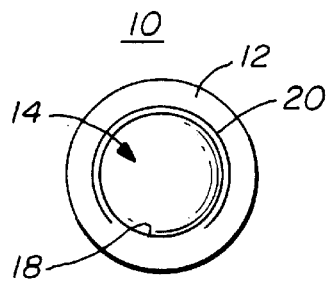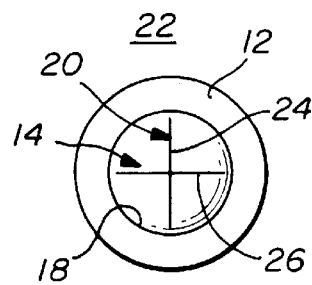
FIG. 1  FIG. 2  FIG. 3
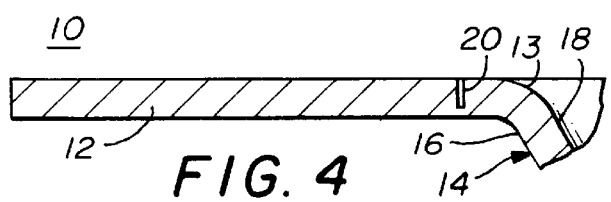
FIG. 4
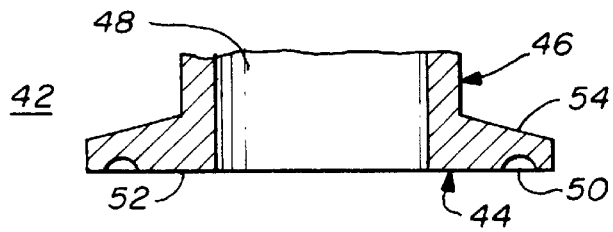
FIG. 5B
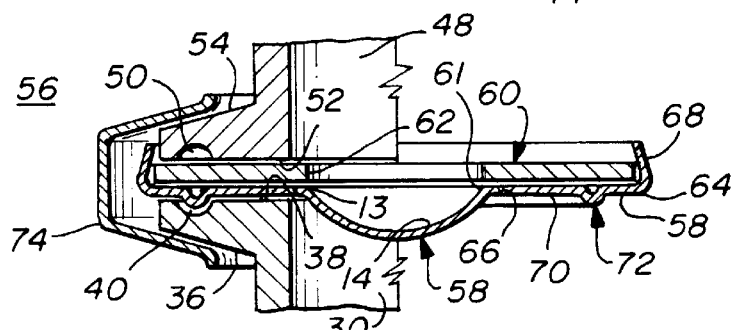
FIG. 6
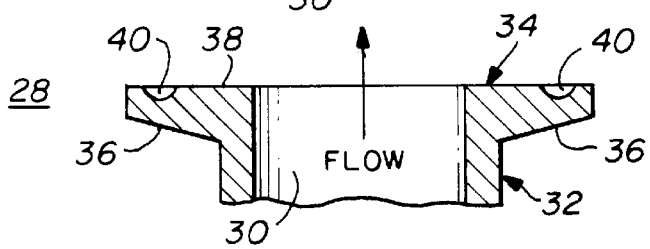
FIG. 5A
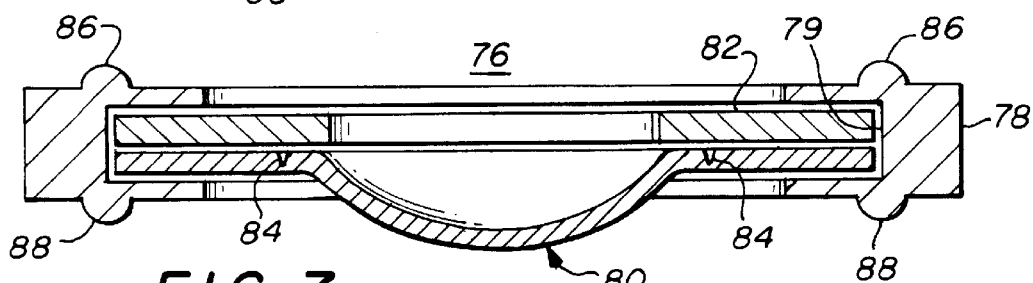
FIG. 7

REVERSE BUCKLING, THERMOFORMED, POLYMER RUPTURE DISK

BACKGROUND OF THE INVENTION

1. Field of the Invention

The present invention relates in general to polymer rupture disks and specifically to a thermoformed polymer rupture disk that can be economically manufactured and utilized in systems where no metal is desired.

2. Description of Related Art Including Information Disclosed Under 37 CFR 1.97 and 1.98

Reverse buckling rupture disks are, of course, well known in the art. To applicant's knowledge, they are all formed of metal and have score lines therein that enable the disks to buckle or burst in a predetermined fashion.

For many, many years Teflon® film has been thermoformed as liners for metal reverse buckling rupture disks in order to separate the metal from any fluids that may be detrimentally affected by metal contact. Further, flat Teflon® rupture disks have been used for many years. Some of the flat Teflon® rupture disks develop a "domed" center section resulting from room temperature pressure applied thereto.

All such polymer rupture disks in the prior art have a flow area after burst that is relatively small and unpredictable. Second, the burst pressure is difficult to change when the burst pressure is controlled by the construction of the customer's rupture disk holder or flanges.

It would be extremely useful to have a reverse buckling, thermoformed, rupture disk with a relatively large, predictable flow area with buckling pressures controlled by score lines or thin areas or buckling points formed therein.

SUMMARY OF THE INVENTION

The present invention discloses and teaches a reverse buckling, thermoformed, polymer rupture disk with a raised center and having score lines therein, or thinned areas that are in predetermined locations and that provide a predetermined flow area after burst and enable the burst pressure to be changed even though the disk's constraining geometry is controlled by the customer's holder or flanges.

The present reverse buckling polymer rupture disk is thermoformed and has an annular flange and a raised center portion, both having a predetermined thickness. The raised portion may be of various shapes including dome-shaped and has an upstream convex side and a downstream concave side and buckles when pressure is applied to the upstream convex side thereof. It has at least one score line formed in the thermoformed polymer rupture disk to create a line of weakness that forms a predetermined burst pattern when rupturing under a predetermined pressure applied to the upstream convex side.

Note that the disk can buckle independently of the score lines. In some cases the score lines are used to influence the location of the buckling point or the magnitude of the buckling pressure. In the preferred embodiment, the buckling pressure and location are primarily defined by the thermoformed shape and thickness. The score line(s) are primarily used as a means to create a weakened and predictable rupture path.

The score line may be formed in several ways. One of the ways is to cause a predetermined thinning in a predetermined area of the rupture disk during thermoforming by applying a vacuum to the area where it is desired to be thinned.

Another method of forming a score line is to use a razor blade that can cut into the polymer material to a predetermined depth.

Still another method of forming the score line is to utilize a press having a relatively sharp blade extending therefrom in the shape of the score line and apply a force to the blades to force them into the surface of the polymer rupture disk to create the very narrow but deep score lines.

The score lines may be formed in the polymer rupture disk either before, after, or during thermoforming the polymer rupture disk.

The desired score line is formed in the flange of the polymer rupture disk adjacent the dome-shaped center portion and extending at least partially around the dome-shaped center portion.

In another embodiment, the score line is formed in the dome-shaped center portion with two score lines perpendicular to each other.

It is desired that the score line be preferably formed on the downstream side of the rupture disk. However, under certain circumstances, it could be formed on the upstream side thereof.

In addition, because some of the rupture disk holding means have centering recesses formed in the annular base thereof, the rupture disk can have a corresponding raised annual centering ring formed in the annular flange, preferably on the upstream side of the polymer rupture disk, to position the rupture disk in fluid flow line in relation to the holding means having the annular recesses.

Further, where first and second holding means have identical fluid flow orifice sizes, a flat rigid annular plate may be placed in the downstream side of the polymer rupture disk with an orifice therein having a diameter that is less than the fluid flow line holding means diameter to form an offset shoulder on the downstream side of the thermoformed polymer rupture disk with respect to the fluid line inside diameter to provide support to the flange area of the rupture disk and prevent bending of said flange area when pressure is applied to the convex side of the rupture disk. In some cases, the outer portion of the annular rupture disk flange can form as a skirt that extends perpendicular to the plane of the annular flange in the direction of the downstream side of the polymer rupture disk to aid in centering the polymer rupture disk in the flow line and contain the flat rigid annular plate.

Thus, it is an object of the present invention to form the reverse buckling polymer rupture disk by thermoforming the disk.

It is another object of the present invention to use Teflon® as the polymer material forming the rupture disk.

It is yet another object of the present invention to provide a reverse buckling, thermoformed, polymer rupture disk with a relatively large, predictable flow area after rupture and that has a buckling pressure that is controlled by score lines or thinned areas or buckling points created in the thermoforming process.

It is still another object of the present invention to provide a thermoformed reverse buckling polymer rupture disk having a score line therein that penetrates through at least 60% of the polymer rupture disk thickness.

It is yet another object of the present invention to provide a rupture disk wherein the score line is thermoformed into the flange of the polymer rupture disk adjacent its dome-shaped center portion and extending at least partially around the dome-shaped center portion.

It is also an object of the present invention to provide a reverse buckling, thermoformed, polymer rupture disk having a score line that is cut into the annular flange of the polymer rupture disk adjacent the dome-shaped center portion and extending at least partially around the dome-shaped center portion.

It is still another object of the present invention to provide a reverse buckling, thermoformed, polymer rupture disk having a score line mechanically pressed into the annular flange of the polymer rupture disk adjacent the dome-shaped center portion and extending at least partially around the dome-shaped center portion.

It is yet another object of the present invention to provide a reverse buckling, thermoformed, polymer rupture disk wherein the score line is formed in the dome-shaped center portion of the polymer rupture disk.

It is also an object of the present invention to provide a reverse buckling polymer rupture disk having a score line preferably formed on the downstream side of the rupture disk.

It is yet another object of the present invention to provide a reverse buckling, thermoformed, polymer rupture disk that has a raised annular centering ring formed in the annular flange on the upstream side thereof and a skirt formed on the outer portion of the annular flange that extends perpendicular to the plane of the annular flange in the direction of the downstream side of the polymer rupture disk to center a flat, rigid, annular plate placed on the downstream side of the polymer rupture disk. An orifice in the annular plate has a diameter less than the fluid flow line inside diameter and forms an offset shoulder on the downstream side of the thermoformed polymer rupture disk with respect to the fluid line inside diameter to provide support to the flange area of the rupture disk and prevent bending of said flange area when pressure is applied to the convex side of the rupture disk.

Thus, the present invention relates to a reverse buckling polymer rupture disk for mounting in a fluid flow line fixture having a predetermined inside diameter and comprising a thermoformed polymer rupture disk having an annular flange and a dome-shaped center portion, both having a predetermined thickness; the dome-shaped portion having an upstream convex side and a downstream concave side and being reverse buckling when pressure is applied to the upstream convex side thereof. At least one score line is formed in the thermoformed polymer rupture disk, either in the annular flange or in the dome-shaped center portion, to create a line of weakness that forms a predetermined burst pattern when rupturing under a predetermined pressure applied to the upstream convex side.

BRIEF DESCRIPTION OF THE DRAWINGS

These and other features of the present invention will be more filly disclosed when taken in conjunction with the following Detailed Description of the Invention in which like numerals represent like elements and in which:

FIG. 1 is a side view of the novel thermoformed polymer rupture disk showing the state of the disk in its unstressed condition, an intermediate condition and the final "ruptured" condition;

FIG. 2 is a bottom plan view of the novel thermoformed polymer rupture disk shown in FIG. 1;

FIG. 3 is a bottom plan view of a thermoformed polymer rupture disk in which score lines are formed in the domed center portion thereof;

FIG. 4 is a partial view of a flange and portion of the domed center of the thermoformed polymer rupture disk illustrating the score line cut in the downstream side thereof;

FIGS. 5A and 5B illustrate first and second adapters that are used to contain the novel thermoformed rupture disk therebetween in a fluid line;

FIG. 6 is a partial cross-sectional view of the novel thermoformed rupture disk to be mounted between the first and second flanges shown in FIG. 5A and FIG. 5B and having a flat, rigid, annular plate placed on the downstream side thereof for providing an offset shoulder to create proper buckling of the thermoformed polymer rupture disk;

FIG. 7 is a cross-sectional view of a gasket holding the novel thermoformed polymer rupture disk and the flat annular plate for forming the offset shoulder such that a single package (gasket plus disk plus flat annular plate) can be inserted between two standard flanges in a fluid flow line;

DETAILED DESCRIPTION OF THE INVENTION

Figure 8:
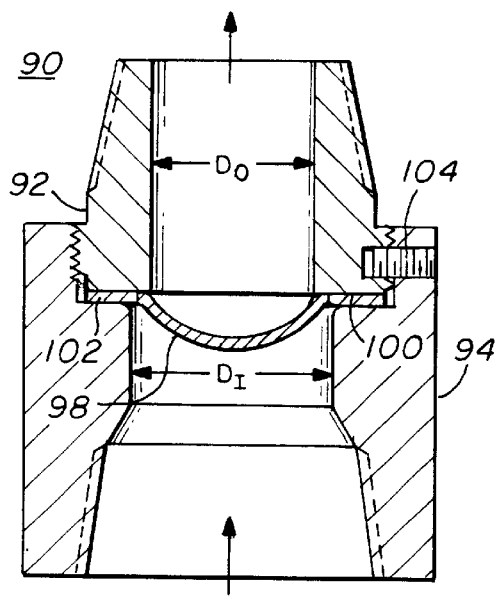
FIG. 8 is a cross-sectional view of one type of the mounting device for holding a thermoformed polymer rupture disk therein in a fluid flow line.

FIG. 1 is a side view of a novel thermoformed polymer rupture disk 10 of the present invention. The polymer material is preferably Teflon® but could be other polymers. It has a flange portion 12 and a raised center portion 14 in the shape of a dome that has a convex side 16 in the direction of the operating pressure or upstream side, all shown in phantom lines to the left of flange 12. A transition area 13 joins the raised center portion 14 and the flange 12. For illustration purposes and as will be discussed in more detail later, there is also shown an irregular area 17 representing the start of buckling in dome 14. To the right of flange portion 12 and also in phantom lines, there is shown an intermediate condition where the original convex side 16 of the dome has inverted and is now concave and the dome portion 14 has partially separated from flange 12. The solid lines represent the final position and condition of disk 10 after rupture is complete.

FIG. 2 is a bottom view of the novel thermoformed polymer rupture disk of FIG. 1 illustrating the concave side 18 of the raised portion, which, in the present embodiment, is shown as the center domed portion 14 and the score line 20 that extends at least partially around the dome-shaped center portion 14. It should be understood that although a raised dome or hemispherical shape is illustrated in the figures as the raised portion, many other raised shapes including but not limited to cylindrical, conical, non-spherical domes, and even combinations of these and other shapes are also intended to be included in the scope of this invention. The score line 20 in the particular case having a dome as shown in FIG. 2 is on the downstream side of the novel thermoformed polymer rupture disk. However, under certain circumstances, as desired, it could be on the upstream side. When pressure is applied to the convex side 16 of the novel thermoformed polymer rupture disk 10 and a predetermined pressure is reached, the disk first buckles in the dome section 14 or in the transition section 13. The pressure continues to reverse the dome of the disk until the dome becomes taut. The force of reversal then exceeds the strength of the material in the score lines and the disk ruptures along the score lines creating a flow area that is large and predictable. The score line may be formed in a number of ways as will be shown hereafter. One way is to cut it into the flange material 12. It can be cut to a depth of at least 60% of the thickness of the polymer disk material and preferably 80%. The groove 20 may also be formed by pressing a sharp edge in the shape of the desired groove into the surface of the novel thermoformed polymer rupture disk to a desired depth. Finally, the score line 20 may be formed by the thermoforming process by applying a vacuum in the thermoforming device to the area in which the score line is to be formed, thus thinning the material.

Thus, with the knife or the pressure-formed score line, the score line may be formed either before, after, or during thermoforming. However, the score line formed by thinning the material is formed during the thermoforming process itself.

FIG. 3 is a plan view of a thermoformed polymer rupture disk having the score line 20 formed of score lines 24 and 26 formed perpendicular to each other in the dome of the disk 22.

FIG. 4 is a partial cross-sectional view of the novel thermoformed polymer rupture disk 10 showing the outer flange 12, the domed center portion 14 with its convex side 16, transition portion 13, and concave side 18, and the score line 20 formed in the annular flange 12 on the downstream side thereof extending at least partially around the dome-shaped center portion 14. Note that score line 20 is narrow and deep.

FIGS. 5A and 5B illustrate two mating adapters 28 and 42 that can be used to mount one of the novel thermoformed polymer rupture disks therebetween. Note, in FIG. 5A, that a first adapter or body portion 28, well known in the art, has a first orifice 30 extending axially therethrough in fluid engagement with the fluid flow line with fluid flow being in the direction shown by the arrow.

A first end 32 on the first adapter 28 provides for attachment to the fluid flow line and a second end 34 has an annular flange 36 with a flat face 38 thereon and extending outwardly from first end 32 diameter for mating with one flange side of the thermoformed polymer rupture disk as will be shown hereafter. A first annular recess 40, preferably semicylindrical in shape, is formed in flat face 38 for engaging at least a portion of the flange of the polymer rupture disk to center it.

A second adapter or body portion 42 is shown in FIG. 5B and is substantially identical to the first adapter 28 so that an essentially universal adapter is obtained and either adapter 28 or 42 may be used in place of the other. It has a first end 44 for mating with the other flange side of the thermoformed polymer rupture disk as will be seen in relation to FIG. 6 and a second end 46 that is vented to atmosphere. A second orifice 48 extends through the second body portion 42 in axial alignment with, and having the same diameter as, the first orifice 30. A second annular recess 50, similar to annular recess 40, is formed in the flat face 52 of the annular flange 54 that extends outwardly from the outer diameter of the second end 46. Flat face 52 is used for mating with the other flange side of the thermoformed polymer rupture disk.

A reverse buckling polymer rupture disk holding device 56, shown in FIG. 6, is mounted in the fluid line. It includes novel thermoformed polymer rupture disk 58 and annular plate support 60. Because the first and second orifices 30 and 48 of the first and second adapters 28 and 42 have the same diameter, the annular plate support 60 in the form of a flat, rigid washer, has an orifice 62 therein that has a smaller diameter than the adapter orifices 30 and 48. Thus, support 60 forms an offset shoulder 61 with respect to the flat faces 38 and 52 of the first and second adapters 28 and 42. The offset shoulder 61 is on the downstream side of rupture disk 58 and therefore the rupture disk 58 first buckles in the dome section 14 or in the transition section 13. The pressure continues to reverse the dome of the disk until the dome becomes taut. The force of reversal then exceeds the strength of the material in the score lines and the disk ruptures along the score lines creating a flow area that is large and predictable.

It will be noted that in FIG. 6 rupture disk 58 has an annular skirt 68 formed on the outer edge 64 of the flange 70 that extends generally perpendicular to the flange 70 in the direction of fluid flow. This skirt is not always needed but when placed in a fixture such as illustrated in FIG. 6 where the annular support 60 is required, the skirt 68 assists in holding the annular support 60 in proper relationship with the rupture disk 58. In some installations that will be shown later, the skirt 68 could extend in the opposite direction perpendicular to the flange 70.

It will also be noted that rupture disk 58 has an annular centering ring 72 extending outwardly from flange 70 on the upstream side of the rupture disk 58. This annular centering ring 72 is sized for mating with the annular grooves or recesses 40 or 50 in the flat faces 38 and 52 of the first and second adapters 28 and 42 to enable proper centering of the rupture disk 58 with respect to the first and second adapters 28 and 42.

After the rupture disk 58 and the annular support 60 are placed between the first and second adapters 28 and 42 as shown in FIG. 6, a clamp 74, well known in the art, is placed around the adapter flanges 36 and 54 and tightened in a well-known manner to maintain the assembly in a fluid-tight relationship.

FIG. 7 illustrates a unitary package 76 for mounting between two adapters such as those shown in FIG. 5A and FIG. 5B. It includes a rubber or otherwise flexible material 78 that is annular in shape and has an annular recess 79 on the inside center thereof for receiving the thermoformed polymer rupture disk 80 and the support plate 82. The thermoformed polymer rupture disk 80 has an annular score line 84 in the outer flange thereof that extends at least partially around the center domed portion thereof. The flexible gasket 78 has annular projections 86 and 88 on the sides thereof that extend into the annular recesses 40 and 50 in the adapter faces shown in FIGS. 5A and 5B thus holding the unit 76 tightly between the adapters. A fastener, well known in the art, can then be placed around the adapter flanges shown in FIG. 6 to hold the entire package 76 therebetween.

FIG. 8 illustrates another embodiment of a holder for the present invention wherein the holder 90 includes a first body portion 92 and a second body portion 94. The first body portion 92 has an inside diameter $D_0$ and the second body portion 94 has an inside diameter $D_1$ that is greater than $D_0$. The novel thermoformed polymer rupture disk 98 is placed between the shoulder 100 of body portion 94 and shoulder 102 of body portion 92 to hold the flanges thereof securely in place. The difference in the diameters $D_1$–$D_0$ forms an offset shoulder for properly positioning the thermoformed polymer rupture disk with respect to the $D_0$ of the first body portion 92 without the need for any annular support plate. A lock pin 104 can be used if desired to lock the first and second body portions 92 and 94 together.

Figure 9:
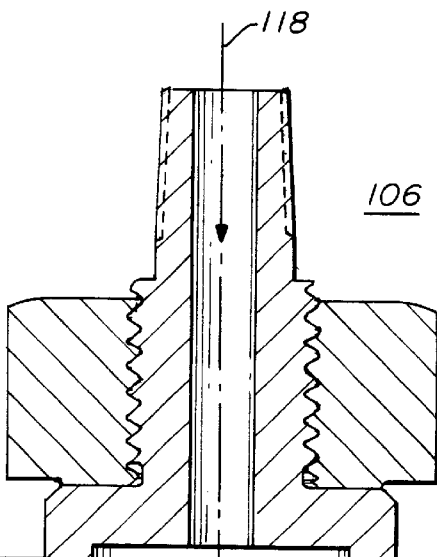
FIG. 9 is a cross-sectional view of a second type of holder illustrating that, in this particular holder, the skirt from the outer edge of the novel thermoformed polymer rupture disk extends perpendicular to the plane of the flange and in the direction of the upstream side of the fixture.

FIG. 9 illustrates a holder for a second embodiment of the novel polymer rupture disk. Note, in FIG. 9, that the unit 106 has the polymer rupture disk 108 with its outer flange 109 being held securely between opposing surfaces 114 and 116. Note, that the score line 112 is on the downstream side thereof. Also note that the skirt 110 on the outer edge of the flange of the thermoformed polymer rupture disk extends generally in the vertical direction with respect to the plane of the flange but extends in the upstream side direction rather than the downstream side direction as shown previously. Therefore, orifice 118 is coupled to fluid pressure and orifice 120 is coupled to the atmosphere.

The novel polymer rupture disks are formed with a thermoforming device such as that disclosed in commonly assigned copending application Ser. No. 09/512,486 filed Feb. 24, 2000 and entitled "Tension Loaded, Thermoformed, Polymer Rupture Disk", incorporated herein by reference in its entirety.

Figure 10:
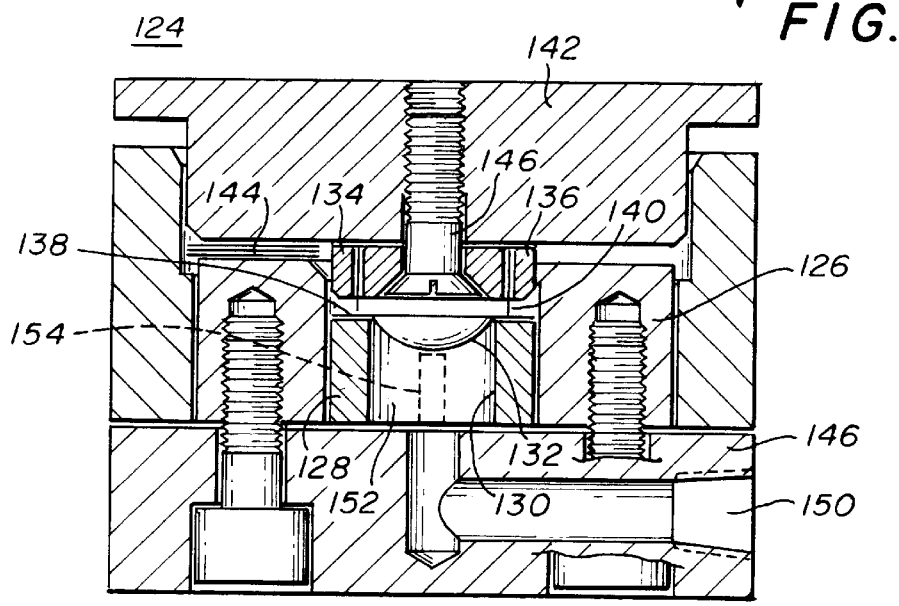
FIG. 10 is a diagrammatic representation of a scoring die device that includes a cutting edge for forming score lines therein.

FIG. 10 is a generalized diagram for a scoring die.

One method of forming the score line therein is to use a razor blade 140 either in the arcuate shape of the score line to be formed or as a single blade that could be rotated by rotating the upper portion 142 of the die to cause the score line to be cut into the downstream side of the flange of the polymer rupture disk.

If the knife blade 140 is a single arcuate blade, then the die 142 can be pressed downwardly to form the score line in the flange 138 of the polymer rupture disk. Shims 144 can be placed between the die 142 and the spacer 126 to set the cut depth and enable the razor blade or knife to cut preferably at least 60% into the polymer rupture disk material.

If desired to form the score line in the dome 132 of the polymer rupture disk, crossed knife blades, two blades perpendicular to each other, and arcuate in shape, would be attached to the lower end of screw 146 in a well-known manner such that, when it is pressed downwardly, it would press the knife blades into the inner side of domed center portion 132. In such case, an anvil 154 (shown in phantom lines) could be placed in the chamber 152 to provide a support for the dome-shaped portion 132 of the polymer disk while the cutting is taking place.

Of course, the cuts could be made in either side of the polymer rupture disk, either the flange or the dome, and could be made either before, during, or after the thermoforming takes place.

When the score line is deformed by thinning the material in the area of the score line using the thermoforming process, then at the point where the score line is to be formed, a vacuum is applied, as shown in commonly assigned copending application Ser. No. 00/512,486 entitled "Tension Loaded, Thermoformed, Polymer Rupture Disk" incorporated herein in its entirety, to thin a particular area and form the score line.

Thermoforming processes are well known in the art and need not be described in any further detail here.

Thus, the novel invention disclosed herein teaches that a polymer rupture disk, preferably Teflon®, can be thermoformed into the proper shape and a score line provided therein to provide a polymer rupture disk that can be used in pressure lines where it is desired that no metal exist. The novel thermoformed polymer rupture disk has a score line that extends preferably through at least 60% of the flange or dome surface thereby enabling a controlled burst pressure and burst pressure area to be formed.

The corresponding structures, materials, acts, and equivalents of all means or step plus function elements in the claims below are intended to include any structure, material, or act for performing the function in combination with other claimed elements as specifically claimed.

What is claimed is:

1. A reverse buckling polymer rupture disk for mounting in a fluid flow line having a predetermined inside diameter and comprising:
    a thermoformed polymer rupture disk having an annular flange and a raised center portion, both having a predetermined thickness;
    said raised portion having an upstream convex side and a downstream concave side and being reverse buckling when pressure is applied to the upstream convex side thereof; and
    at least one score line cut in the thermoformed polymer rupture disk to create a line of weakness that forms a predetermined burst pattern when rupturing under a predetermined pressure applied to said upstream convex side;
    at least one score line cut in the thermoformed polymer rupture disk to create a line of weakness that forms a predetermined burst pattern when rupturing under a predetermined pressure applied to said upstream convex side;
    a skirt formed on an outer portion of said annular flange and extending perpendicular to the plane of said annular flange to center the polymer rupture disk in said fluid flow line; and
    an orifice in said annular plate having a diameter that is less than the fluid flow line inside diameter and that forms an offset shoulder on the downstream side of said thermoformed polymer rupture disk with respect to said fluid line inside diameter to enable said thermoformed polymer rupture disk to rupture along said score line and form said predetermined burst pattern.

2. The rupture disk of claim 1 wherein said score line penetrates through at least 60% of the polymer disk thickness.

3. The rupture disk of claim 1 wherein said score line is cut into the annular flange of said polymer rupture disk adjacent the raised center portion and extends at least partially around said raised center portion.

4. The rupture disk of claim 1 wherein said score line is cut in said raised center portion of said polymer rupture disk.

5. The rupture disk of claim 4 wherein said score line cut in said raised center portion has two score lines perpendicular to each other.

6. The rupture disk of claim 1 wherein said score line is cut into the downstream side of said rupture disk.

7. The rupture disk of claim 1 further comprising a raised annular centering ring formed as an integral part of the annular flange of said polymer rupture disk to position said rupture disk in said fluid flow line.

8. The rupture disk of claim 1 wherein said skirt extends in the direction of said downstream side and further comprising:
    a flat, rigid, annular plate placed on the downstream side of said polymer rupture disk, and contained within said skirt; and
    an orifice in said annular plate having a diameter that is less than the fluid flow line inside diameter and that forms an offset shoulder on the downstream side of said thermoformed polymer rupture disk with respect to said fluid line inside diameter to enable said thermoformed polymer rupture disk to rupture along said score line and form said predetermined burst pattern.

9. A reverse buckling polymer rupture disk for mounting in a fluid flow line having a predetermined inside diameter and comprising:

a thermoformed polymer rupture disk having an annular flange and a raised center portion, both having a predetermined thickness;

said raised portion having an upstream convex side and a downstream concave side and being reverse buckling when pressure is applied to the upstream convex side thereof;

a raised annular centering ring formed in said annular flange on the upstream side of said polymer rupture disk to position said rupture disk in said fluid flow line;

at least one score line formed in the thermoformed polymer rupture disk to create a line of weakness that forms a predetermined burst pattern when rupturing under a predetermined pressure applied to said upstream convex side; and an outer portion of said annular flange, said outer portion forming a skirt extending perpendicular to the plane of said annular flange of said polymer rupture disk to center the polymer rupture disk in said fluid flow line.

10. The rupture disk of claim 9 further comprising:

a flat, rigid, annular plate placed and contained within said skirt; and an orifice in said annular plate having a diameter that is less than the fluid flow line inside diameter and that forms an offset shoulder with respect to said fluid line inside diameter to enable said thermoformed polymer rupture disk to rupture along said score line and form said predetermined burst pattern.

11. A reverse buckling polymer rupture disk for mounting in a fluid flow line having a predetermined inside diameter and comprising:

a thermoformed polymer rupture disk having an annular flange outer portion and a raised center portion, both having a predetermined thickness;

said raised portion having an upstream convex side and a downstream concave side and being reverse buckling when pressure is applied to the upstream convex side thereof;

a skirt formed on an outer portion of said annular flange, said skirt extending perpendicular to the plane of said annular flange in the direction of said downstream side of said polymer rupture disk to position said rupture disk in said fluid flow line; and at least one score line formed in the thermoformed polymer rupture disk to create a line of weakness that forms a predetermined burst pattern when rupturing under a predetermined pressure applied to said upstream convex side.

12. The rupture disk of claim 11 wherein said score line is cut into the annular flange of said polymer rupture disk adjacent the raised center portion and extends at least partially around said raised center portion.

13. The rupture disk of claim 11 further comprising:

a flat, rigid, annular plate placed on the downstream side of said polymer rupture disk, and contained within said centering skirt; and an orifice in said annular plate having a diameter that is less than the fluid flow line inside diameter and that forms an offset shoulder on the downstream side of said thermoformed polymer rupture disk with respect to said fluid line inside diameter to enable said thermoformed polymer rupture disk to rupture along said score line and form said predetermined burst pattern.

* * * * *

UNITED STATES PATENT AND TRADEMARK OFFICE
CERTIFICATE OF CORRECTION

PATENT NO. : 6,298,869 B1 Page 1 of 1
DATED : October 9, 2001
INVENTOR(S) : John L. Strelow It is certified that error appears in the above-identified patent and that said Letters Patent is hereby corrected as shown below:

Column 7,
Line 51, delete "00/512,488" and substitute therefor -- 09/512,488 --.

Signed and Sealed this

Twenty-eighth Day of January, 2003

JAMES E. ROGAN
*Director of the United States Patent and Trademark Office*